June 13, 1950 R. DAUB 2,511,248
INTERNAL-COMBUSTION ENGINE LUBRICATION
Original Filed Dec. 27, 1941 6 Sheets-Sheet 2
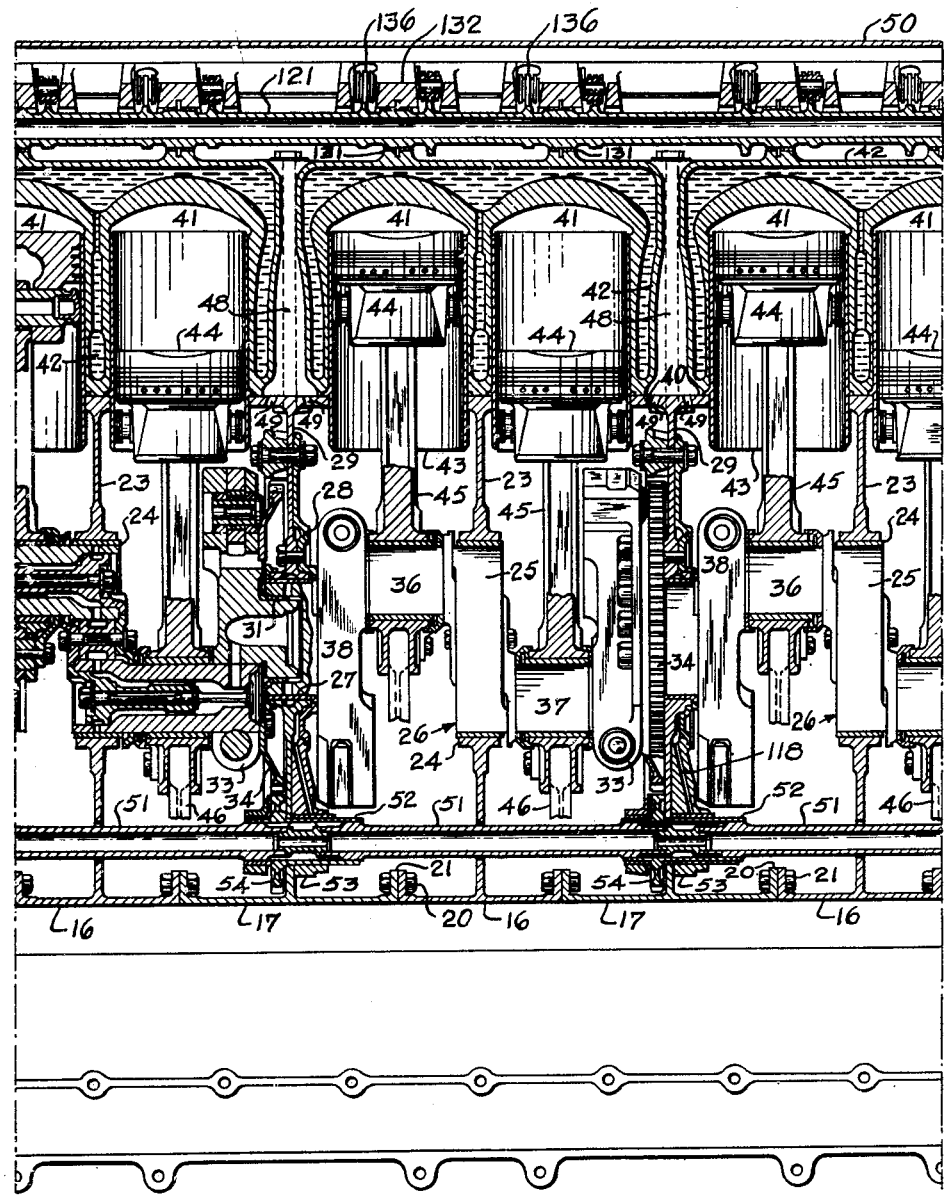
Fig. 2
INVENTOR
RUDOLPH DAUB
BY 
ATTORNEY June 13, 1950 R. DAUB 2,511,248
INTERNAL-COMBUSTION ENGINE LUBRICATION
Original Filed Dec. 27, 1941 6 Sheets—Sheet 4

INVENTOR
RUDOLPH DAUB
BY
ATTORNEY

June 13, 1950 R. DAUB 2,511,248
INTERNAL-COMBUSTION ENGINE LUBRICATION
Original Filed Dec. 27, 1941 6 Sheets-Sheet 5

INVENTOR
RUDOLPH DAUB
BY
ATTORNEY

INVENTOR.
RUDOLPH DAUB
BY
ATTORNEY

Patented June 13, 1950

2,511,248

UNITED STATES PATENT OFFICE 2,511,248

INTERNAL-COMBUSTION ENGINE LUBRICATION

Rudolph Daub, Caldwell, N. J., assignor to Wright Aeronautical Corporation, a corporation of New York Original application December 27, 1941, Serial No. 424,560. Divided and this application June 26, 1944, Serial No. 542,103

3 Claims. (Cl. 184—6)

This invention is a division of application Serial No. 424,560 filed December 27, 1941, now Patent No. 2,355,277 and relates to internal combustion engines and in particular comprises a continuing development of the engine design principles disclosed in the application of W. B. Goodman, Serial No. 424,563, filed December 27, 1941 now Patent No. 2,366,852.

In general, an object of the invention is to provide an internal combustion engine assembly in which a very large number of engine cylinders are used in order to secure high power in a single engine unit. A further object of the invention is to provide an aircraft engine of high power in which the components of the engine are so designed and arranged as to secure maximum power output with minimum bulk and weight, an associated object to provide an engine in which the design is as simple, and the components as accessible, as is possible to secure in a power plant of the class here dealt with. A further object is to provide an improved lubrication system for a multi-cylinder engine.

The above objects and further objects will become clear in reading the annexed detailed description of the invention in connection with the drawings, in which:

Figs. 1, 2 and 3 are longitudinal sections through the engine, representing respectively the front, middle and rear portions of the engine;

Figure 1:
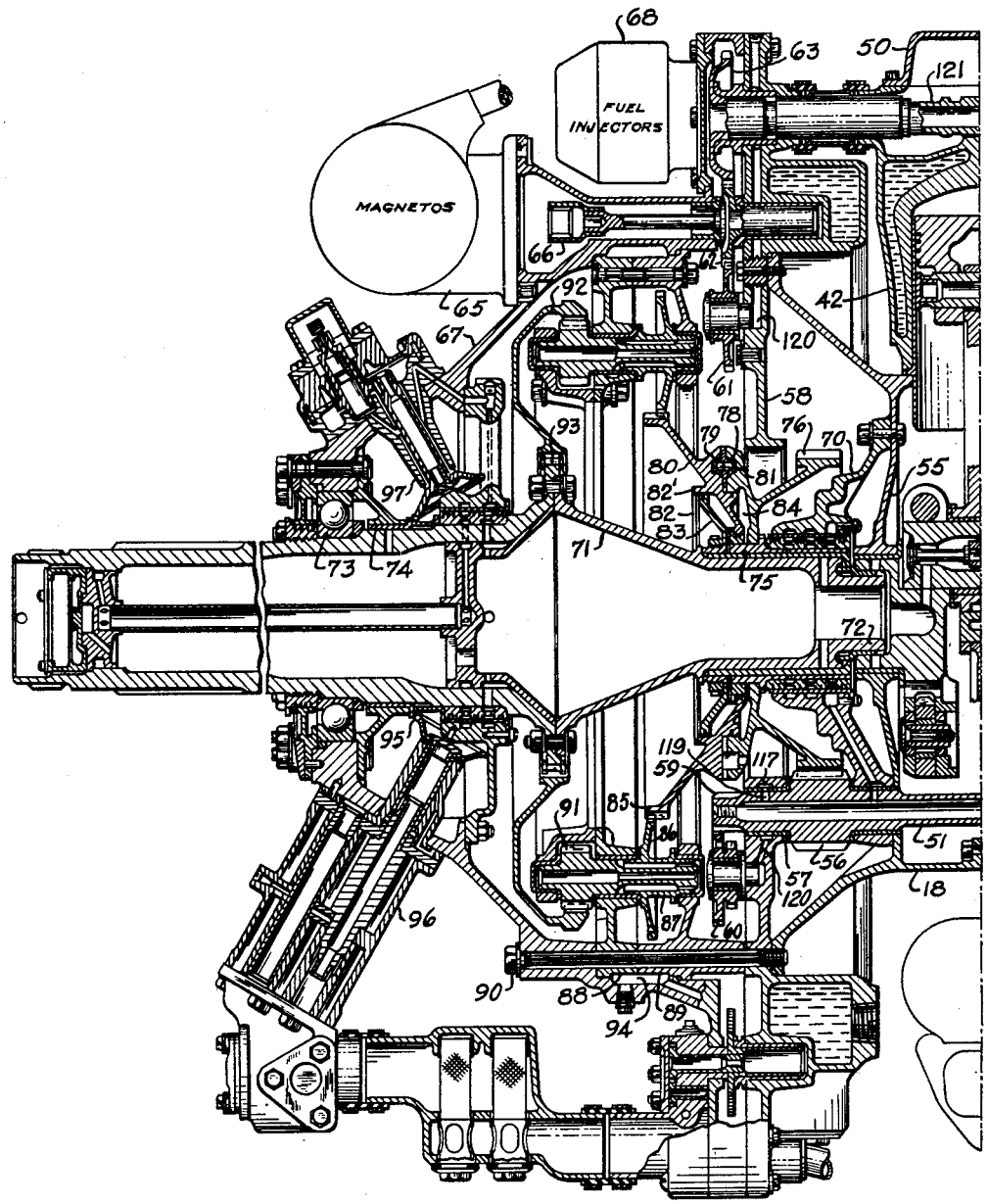

Figs. 1 to 6 of the drawings in this case are similar to corresponding views of the drawings in the Goodman application above referred to. The basic engine structure consists briefly of a plurality of tandem arranged polygonal crankcase units the flat faces of these crankcase sections being aligned in a fore-and-aft direction. En bloc cylinder rows are secured to the crankcase faces or decks formed by the built-up crankcase sections whereby the engine may be considered as a multi-bank radial cylinder engine, or as an in-line engine having a plurality of radially arranged rows. Each bank of cylinders includes the usual pistons and connecting rods, one of the connecting rods engaging a crankpin of a crankshaft associated with that bank. There are a plurality of crankshafts extending in tandem through the engine and each of these crankshafts is geared to a plurality of high speed layshafts, disposed around the crankshafts and between the skirts of the radially arranged cylinders. The front ends of the layshafts are geared to a central power shaft, coaxial with the crankshaft. Each cylinder row includes an overhead camshaft driven from gears at the front end of the engine which gears also serve to drive certain engine auxiliaries. Other engine auxiliaries are disposed at the rear end of the engine and are driven from the several high speed layshafts and from one of the crankshafts.

Referring first to Figs. 1, 2, 3 and 4, I show a plurality of crankcase units 16 and 17 in alternate tandem relation. Secured to the front end of the forwardmost crankcase section 16 is a front crankcase section 18, and secured to the rear end of the rearwardmost crankcase section 16 is a rear crankcase section 19. These crankcase sections are bolted to one another by bolts 20 engaging inturned flanges 21 formed on respective crankcase sections at the diametral planes of the several banks of cylinders. Each crankcase section 16 includes a bearing diaphragm 23 having a main bearing bushing 24 for the center journal 25 of a two-throw crankshaft unit 26. The front journal of said crankshaft unit, as at 27, is borne in a main bearing bushing 28 secured within a bearing diaphragm 29 integral with each crankcase section 17. The rear journal 31 of each crankshaft unit 26 is piloted in a counterbore in the front journal 27 of the next rearward crankshaft in such a manner that adjacent tandem crankshafts may oscillate freely with respect to each other. The rear crankcheek 33 of each crankshaft 26 carries a drive gear 34 which is securely bolted to the cheek, said drive gear lying between the rear face of its crankcheek and the adjacent bearing diaphragm 29. The crankshafts per se are of built-up construction, the center journal 25 and adjacent crankpins 36 and 37 comprising an integral unit, the rear crankcheek 33 being clamp-bolted to the rear crankpin 37 and the front crankcheek 38 being clamp-bolted to the front crankpin 36, said rear and front crankcheeks respectively being integral with the rear and front journals 31 and 27.

As indicated above, the several crankcase sections 16 to 19 are of polygonal exterior form and when assembled comprise exteriorly an elongated polygonal cylinder wherein the polygonal sides comprise cylinder decks, one of these decks being numbered 40. To each deck, an en bloc cylinder row is secured which bridges the built-up crankcase sections, and in the embodiment shown, each cylinder row includes six cylinders 41 preferably of cast material to provide integral coolant jackets 42. Each cylinder carries a liner 43 and in each cylinder is engaged a piston 44 equipped with a piston rod. One piston of a bank is pinned to a master connecting rod 45 having a solid or continuous big end bearing, engaging its associated crankpin 36 or 37. Articulated connecting rods 46 connect the remaining pistons of each cylinder bank with the master connecting rod, as is conventional practice in radial cylinder engines. It will be noted that the cylinders of any one longitudinal row are arranged substantially in pairs—for instance, the central two cylinders shown are closer to one another than to the cylinder pairs ahead of them or behind them. This spacing of cylinder pairs is to allow for a through passage 48 between them which passage extends from the top of the cylinder block to the cylinder deck 40 drilled at 49 on each side of the bearing diaphragm 29 to allow free communication from the crankcase interior to a camshaft and valve cavity, extended along the top of each row of cylinders, said cavity being established by a cylinder cover 50 secured to suitable flanges 47 integral with the cylinder jacket castings.

Between the sleeves 43 of the cylinders are disposed layshafts 51, parallel to the crankshaft axis. These layshafts as shown in Fig. 2, comprise tandem sections whose ends are splined to sleeves 52 which are borne in bearings 53 secured to the diaphragms 29. Integral with each sleeve 52 is a pinion 54 which engages one of the crankshaft gears 34. The front end of the front layshaft 51 is carried in a bearing in the diaphragm 55 at the front of the crankcase section 18 and carries an integral drive pinion 56 borne in an outboard bearing 57 in an auxiliary diaphragm 58 secured to the crankcase. A small pinion 59 is formed at the extreme front end of the front section of each layshaft 51, this pinion driving a compound idler gear 60, in turn driving an idler gear 61, an idler gear 62, and a camshaft gear 63, all of which are journalled in the diaphragm 58. There is one gear train 59, 60, 61, 62, and 63 for each layshaft 51 and for each row of cylinders, said gear trains are not exactly radial so that a single complete gear train is not visible in Figure 1. As shown in Fig. 1, one of the idler gears such as 62 may be used to drive an engine auxiliary such as a magneto 65, to serve the adjacent cylinder row, through a shaft 66 secured to the crankcase nose section 67. If the engine is of the fuel injection type, a fuel injector unit 68, to serve the adjacent cylinder row, may be driven from each camshaft gear 63. The magneto and fuel injector of each cylinder row serves that cylinder row and may be timed perfectly in accord with piston positions of that row. This arrangement avoids the timing inaccuracies common to usual radial engines having master and articulated connecting rods wherein the magnetos are driven from the crankshaft and serve all cylinders of a radial bank. In this engine, one magneto serves all master rod cylinders, and another magneto serves each aligned row of articulated rod cylinders.

As shown, the engine may be considered as a six bank radial engine having seven cylinders per bank, or alternately, as an in-line engine having seven radial rows of six cylinders each. The number of cylinders in each bank or in each row may be changed as desired. For instance, each row might have four cylinders, and the center crankshaft unit would be eliminated, giving a 28 cylinder engine.

To the front crankcase diaphragm 55, a bearing member 70 is secured which forms an oil transfer bearing cooperating with the rear end of a propeller shaft 71 at the extreme rear end of which is a journal 72 piloted in the bearing in the front end of the front crankshaft. Said propeller shaft 71 is further carried in a thrust bearing 73 and a radial bearing 74 at the front end of the crankcase nose section 67. Piloted on a bushing 75 associated with the oil transfer bearing in the member 70 is an intermediate gear 76 meshed with the several layshaft pinions 56. Said gear includes inclined annularly arranged pockets 78 opposite similar annularly arranged inclined pockets 79 in an axially shiftable member 80, there being a plurality of rollers 81 between said pockets to transfer torsional driving effort from the gear 76 to the member 80 while at the same time creating an axial force between said members which is proportional to the torque transmitted. A cylinder 82 is formed in the member 80 which is engaged by a piston 83 rigid with the bushing 75 and with the gear 76. Fluid under pressure is admitted to the cavity between the piston and cylinder through the oil transfer bearing in the member 70 to counteract the axial thrust caused by transmitted torque. Pressure of the hydraulic fluid in the cylinder 82 will thus be proportional to torque transmitted and this pressure is registered on an appropriate gauge. As pressure builds up in the cylinder 82, it will be moved axially relative to the piston, until the latter uncovers a bleed port 82' in the cylinder rim to establish a pressure proportional to the torque transmitted. A centrifugal balance cell 84 is formed between the member 80 and a portion of the hub of the gear 76, to which oil bleeds from the cylinder 82. This cell is vented close to its most radially inward point, so that, during rotation of the system the centriufgally produced oil pressures in the cell 84 and in the cylinder 82 are balanced and thus do not affect torque-proportional pressure in the cylinder 82. The member 80 carries a gear 85 meshed with a plurality of gears 86 on layshafts 87 journalled in bearing members 88 and 89 secured to the crankcase nose section 67 by bolts 90. Said layshafts carry pinions 91 meshed with a ring gear 92 secured at a spline connection 93, to the propeller shaft 71. It will be noted that said shaft comprises rearward and forward portions which are secured to one another in the region of the spline connection 93. The members 88 and 89 define, with the crankcase nose section 67, an annular oil duct 94 serving as a distributor, as will become apparent.

When changes in the reduction gear ratio, or a dual propeller shaft or a two speed propeller drive are desired, these matters may be taken care of by altering the gears and elements 86, 87, 88, 89, 91 and 92, as a bench assembly, separate from the engine per se, and installed as a unit in the nose section. Furthermore, the torque meter remains intact with the engine and, since it is disposed between the engine and reduction gear, always indicates true engine torque regardless of the reduction gear ratio.

Immediately rearward of the plane radial bearing 74 is a bevel gear 95, secured to the propeller shaft, which gear serves to drive an oil pump unit 96 and a propeller governor unit 97, both of said units being secured to the crankcase nose section 67.

Figure 3:
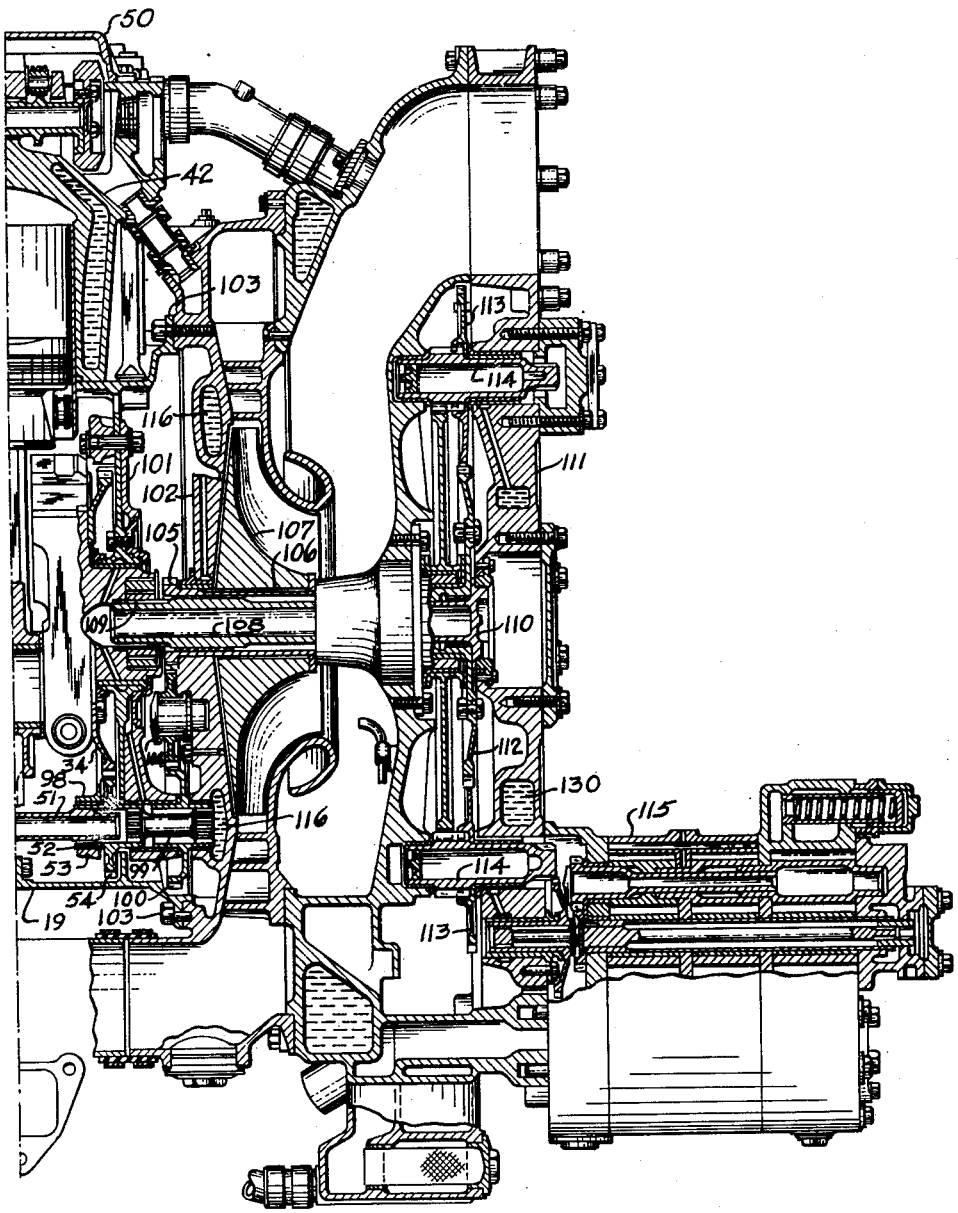

Referring now to Fig. 3, the rear crankcase section 19 carries a bearing member 98 in which the rearmost layshaft pinion 54 is journalled. The pinion 54, as before described, has a spline connection with the rear layshaft 51. The sleeves 52 of one or more of the rear pinions 54 are splined to a short shaft 99 splined to a gear 100 borne in bearings in a rear crankcase bearing member 101 and in a front supercharger housing member 102, the latter being secured as at 103 to the rear crankcase 19. Idler gears 104 are carried by the housing 102, which are driven by the gears 100 and which drive the supercharger impeller shaft gear 105, the impeller shaft with which said gear is integral being designated 106 and having splined thereto a supercharger impeller 107. The shaft 106 is piloted upon a rear crankshaft extension 108 whose front end is splined to the rear cheek of the rear crankshaft at 109. The rear end of the shaft 108 is splined to a starter drive dog 110 secured in a crankcase accessory section 111. Said shaft 108 carries a gear 112 on its rear end meshed with a plurality of gears 113 on layshafts 114 which comprise power takeoffs for various engine auxiliaries such as generators, tachometer drives, and oil pumps, an oil pump unit being shown at 115.

It will be noted that the rear crankshaft extension 108 is at the same end of the rear crankshaft as its power gear 34, insuring smooth torque to the accessory drives, uninfluenced by torsional wind-up in the crankshaft. In the usual engine, power is taken from one end of the crankshaft while accessories are driven from the other, unbalancing the phase relation therebetween due to variations in angular deflection between the crankshaft ends caused by torque variations.

In this engine, direction of rotation may be reversed merely by changing the camshafts, the supercharger impeller and diffuser, and altering the drive gearing in the accessory section to allow accessories to rotate in the same direction as before the change was made. The accessory section change would consist in adding an idler gear between the gears 112 and 113.

The rear oil pump unit includes a pressure pump and a scavenging pump, the former delivering pressure oil through a suitable conduit in the crankcase sections, not shown, to a pressure oil annulus 116 integral with the front supercharger housing 102, said annulus passing across the rear ends of the several layshafts 51, said layshafts being hollow. The short shafts 99 preferably are also hollow whereby oil under pressure is transmitted from the annulus 116 through the shafts 99 as well as through the spaces between the splines of the shafts 99 with layshafts 51 and said oil passes forwardly along the layshafts which are provided at appropriate intervals with openings communicating with holes in bearing bushings which in turn communicate with oil passages such as 118 leading to the main crankshaft bearings of the engine. Said main crankshaft bearings in turn are drilled to conduct oil to the crankshaft interiors whence oil is conducted to the crankpin bearings for lubrication of the connecting rod bearings, knuckle pin bearings and pistons in the usual manner. Referring briefly to Fig. 1, it will be noted that the front section of the layshafts 51 are provided with drillings to lubricate certain of the reduction gear bearings and, through suitable crankcase passages, such as schematically indicated at 94' in Figure 7, pressure oil is led from the layshaft head or front ends to the distributing annulus 94 and thence to sundry bearings of the reduction gear and nose section.

Figure 6:
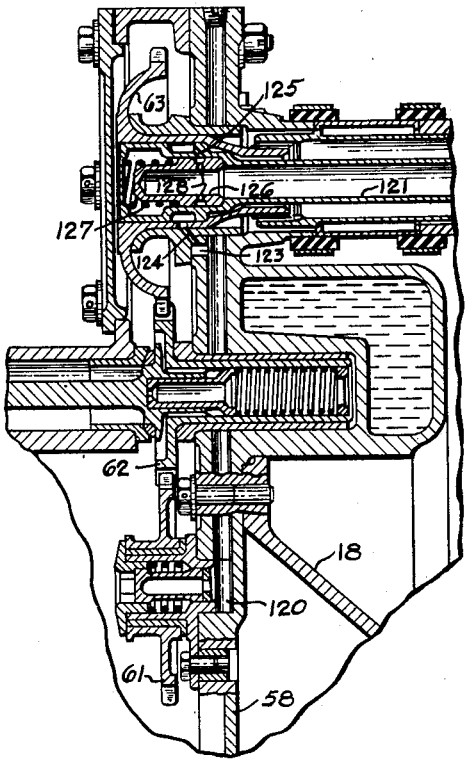
Fig. 6 is an enlarged longitudinal section through a portion of Fig. 1.
Figure 5:
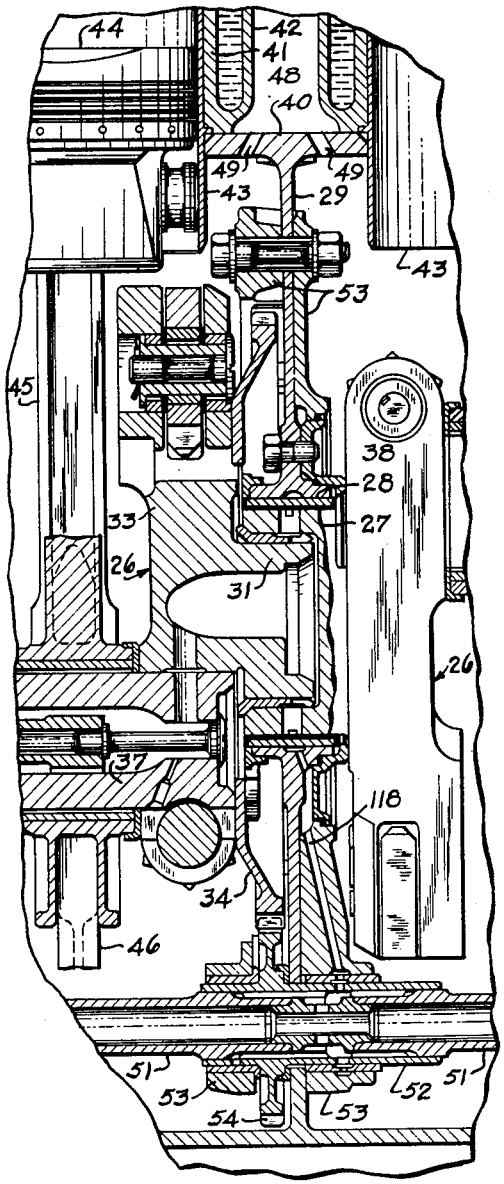
Fig. 5 is an enlarged longitudinal section through a portion of Fig. 2.
Figure 7:
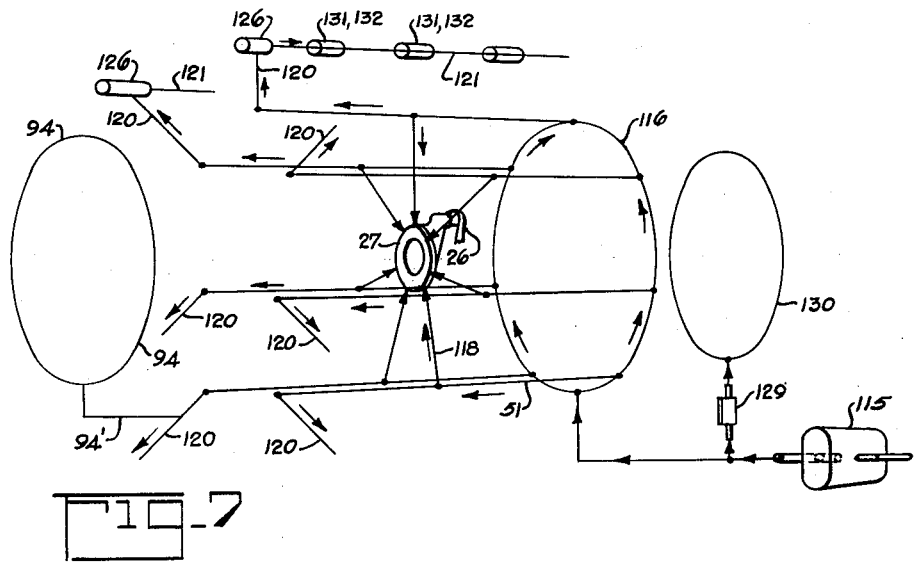
Fig. 7 is a diagrammatic perspective view of the engine lubrication system.
Figure 8:
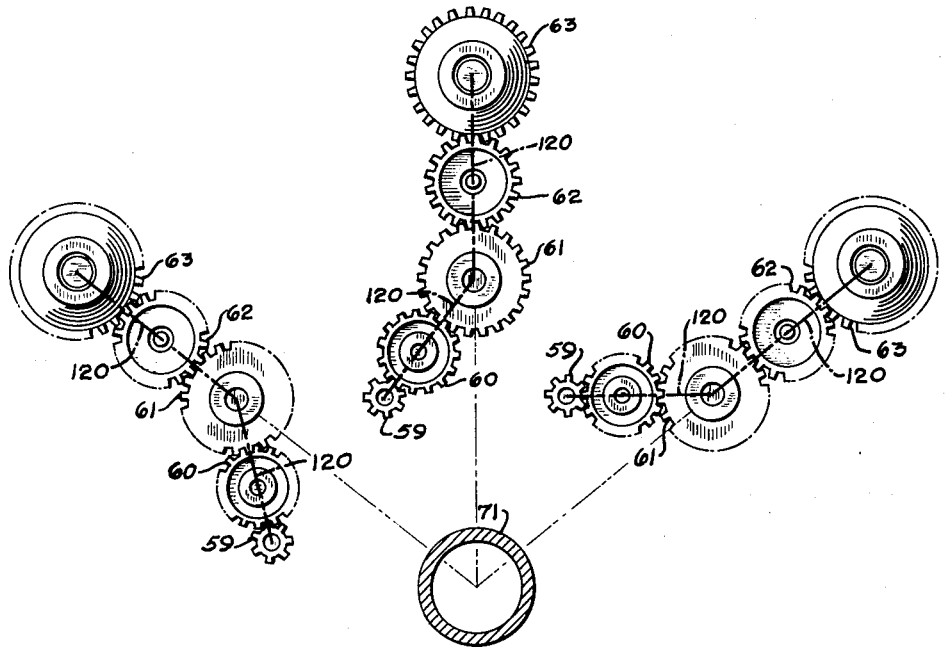
Figure 8 is a schematic view illustrating the gear train drivably connecting each layshaft with a crankshaft and also illustrating the oil flow passage from each layshaft to its associated cam shaft.

Figures 1 and 6 show one of several similar oil passages 120, fed from the layshaft, each said passage 120 communicating with an annular groove 117 in a layshaft bearing 57 and thence with the interior of its associated layshaft through radial holes 119. Each passage 120 passes across the journals for the several camshaft idler gears 60, 61 and 62 for one cylinder row, for lubrication thereof, to the bearing for the camshaft gear 63. The passages 120 are schematically illustrated in Figures 7 and 8. This bearing with associated parts comprises an automatic pressure reducer to admit oil to the hollow camshaft 121 at a pressure less than full pump pressure. To this end, drillings 123, 124, and 125 are formed in the several bushings and hub elements of the camshaft gear, the drilling 125 being in the camshaft 121 and forming a port which cooperates with an axially slidable valve 126 normally urged to the right by a spring 127. Said sleeve includes radial drillings 128 which may at times register with drillings 125 to allow of oil entrance into the hollow camshaft. When the oil pressure within the camshaft increases, the valve 126 will move to the left under the influence of said pressure, against the spring 127, to throttle the drilling 125 and to maintain within the camshaft an oil pressure established by the strength of the spring 127. The purpose of this reduction in oil pressure to the camshaft is to control oil flow and to avoid excessive oil bleed from the pressure system, since the lubrication requirements for the valve gear are small. There is a similar system for each camshaft and for each cylinder row.

In a diagramatic representation of the lubrication system in Fig. 7, this oil pressure reducer is designated 126. Another pressure reducing valve 129, shown in Fig. 7, is arranged between the oil pump 115 and a low pressure oil feed annulus 130 in the accessory drive section 111 (Fig. 3), this annulus serving as an oil header for the lubrication of the several accessory drive gears.

Figure 4:
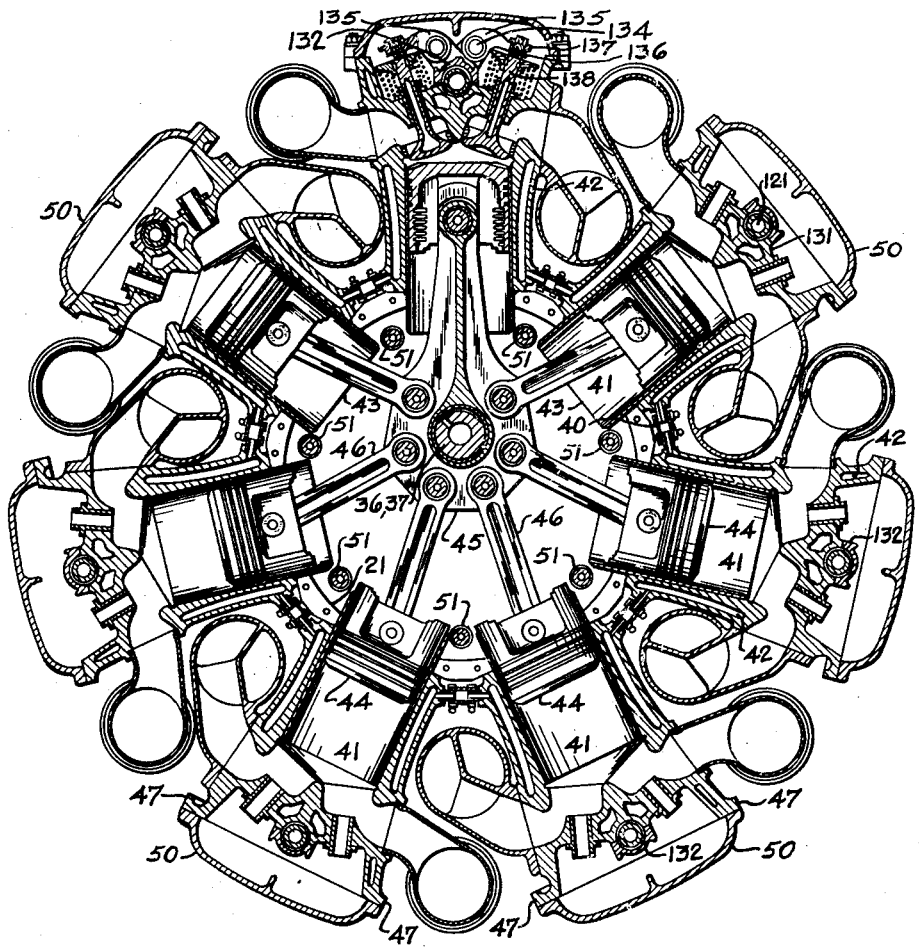
Fig. 4 is a section through the engine on the central plane through one of the several banks of cylinders.

Referring to Figs. 2 and 4 it will be seen that each camshaft 121 extends the full length of each cylinder row and is journalled in a lower bearing half 131 formed in the head of each cylinder and carrying a suitable half bushing. The bearing cap 132 which secures the camshaft to the bearing half 131 is bolted to the cylinder head and comprises a unitary fitting which includes two sets of rocker bearings 134 axially parallel to the camshaft and spaced above and to either side of the camshaft. These bearings carry rocker arms 135 having rollers 136 engaged with the camshaft and having adjustable elements 137 for engagement with the tops of valve stems 138. This unitary bearing cap and rocker carrier 132 avoids the use of many small parts and affords easy assembly and disassembly of the rocker system and of the camshaft assembly. There is one cap and rocker assembly 132 for each cylinder head and it will be noted that bending deflections in the camshaft are minimized by having a camshaft bearing between each pair of cams and rocker arms. The valves 138 are carried in valve guides in the cylinder head in the conventional manner, as shown in Fig. 4, and their heads engage inserted valve seats at the top of each combustion chamber.

While I have described by invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In an engine including a crankshaft and a hollow camshaft; a lubrication system therefore comprising an oil pump operable to supply oil under full pump pressure to the crankshaft bearings, passage means for supplying oil from said pump to the hollow camshaft and thence to the camshaft bearings, and valve means co-axial with said hollow camshaft for controlling the admission of oil therein, said valve means being arranged to automatically move in a closing direction in response to an increase in the oil pressure within said camshaft.

2. In an engine including a crankshaft and a hollow camshaft; a lubrication system therefore comprising an oil pump operable to supply oil under pressure to the crankshaft bearings, a passage for supplying oil from said pump to the hollow camshaft and thence to camshaft bearings, a valve for controlling the admission of oil into said hollow camshaft, and a spring for urging said valve in a direction for opening said passage, said valve being arranged to automatically move in a closing direction in response to an increase in oil pressure within said camshaft.

3. In an engine including a crankshaft; a lubrication system therefore comprising an oil pump operable to supply oil under pressure to the crankshaft bearings, a passage for supplying oil from said pump to other bearing surfaces of said engine, a valve controlling the flow of oil through said passage to said bearing surfaces, and a spring for urging said valve in a direction to open said passage, said valve being urged against said spring in response to the oil pressure on the downstream side of said valve.

RUDOLPH DAUB.

REFERENCES CITED

The following references are of record in the file of this patent:

UNITED STATES PATENTS

| Number | Name | Date |
|---|---|---|
| 1,266,288 | Loomis | May 14, 1918 |
| 1,381,150 | White | June 14, 1921 |
| 1,427,190 | Brown | Aug. 29, 1922 |
| 1,622,172 | Angle | Mar. 22, 1927 |
| 1,676,418 | Vincent | July 10, 1928 |
| 1,690,030 | Noble | Oct. 30, 1928 |
| 1,815,868 | Schenk | July 21, 1931 |
| 1,897,191 | Farina | Feb. 14, 1933 |
| 1,900,968 | Woolson | Mar. 14, 1933 |
| 1,975,826 | Codrington | Oct. 9, 1934 |
| 2,043,529 | Davis | June 9, 1936 |